United States Patent [19]

Dendy et al.

[11] 3,999,100

[45] Dec. 21, 1976

[54] LAMP POWER SUPPLY USING A SWITCHING REGULATOR AND COMMUTATOR

[75] Inventors: King Hubert Dendy, Panorama City; Morton B. Leskin, Sherman Oaks, both of Calif.

[73] Assignee: Morton B. Leskin, Sherman Oaks, Calif.

[22] Filed: May 19, 1975

[21] Appl. No.: 578,490

[52] U.S. Cl. ............................... 315/308; 315/205; 315/208; 315/224; 315/287; 315/291; 315/DIG. 5; 321/19; 321/45 C

[51] Int. Cl.$^2$ .................... H05B 41/36; G05F 1/08

[58] Field of Search ............... 315/208, 209 R, 224, 315/287, 291, 308, DIG. 5, DIG. 7, 200 R, 205; 321/18, 19, 45 C

[56] References Cited

UNITED STATES PATENTS

| | | |
|---|---|---|
| 3,486,070 | 12/1969 | Engel ..................... 315/209 R X |
| 3,590,316 | 6/1971 | Engel et al. .................... 315/209 R |
| 3,648,106 | 3/1972 | Engel et al. ..................... 315/291 |
| 3,890,537 | 6/1975 | Park et al. ..................... 315/224 X |
| 3,909,668 | 9/1975 | Laakmann et al. ............ 315/209 R |

Primary Examiner—Eugene La Roche
Attorney, Agent, or Firm—Howard A. Silber

[57] ABSTRACT

A power supply for an ac metal halide lamp employs a dc regulator in conjunction with a commutator for supplying the regulated dc power to the lamp with alternating polarity. A feedback circuit senses the dc voltage and current fed to the commutator and cooperates with the regulator to provide substantially constant power to the lamp. The commutator switching times are sufficiently rapid so that flickerless light output is obtained.

20 Claims, 2 Drawing Figures

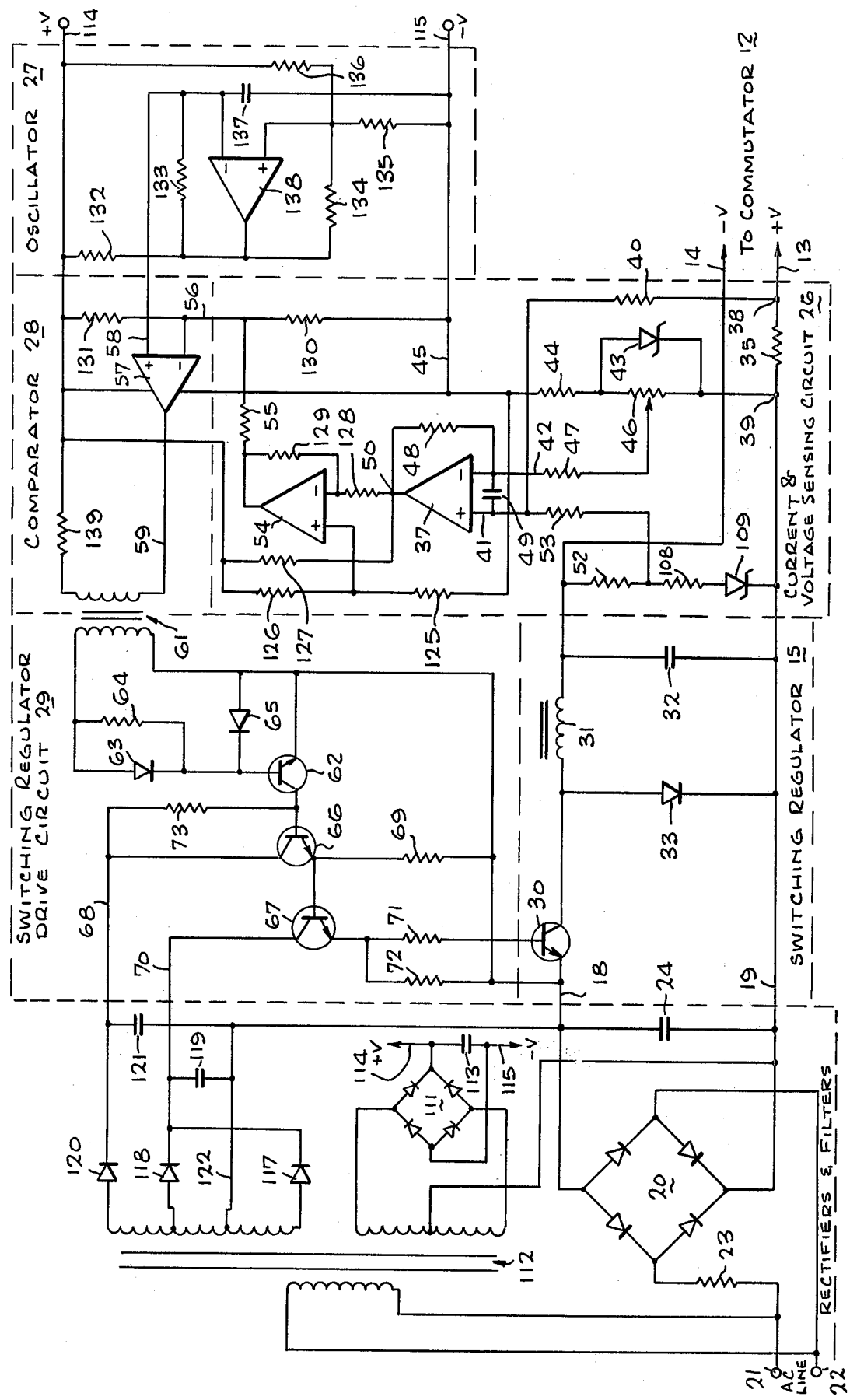

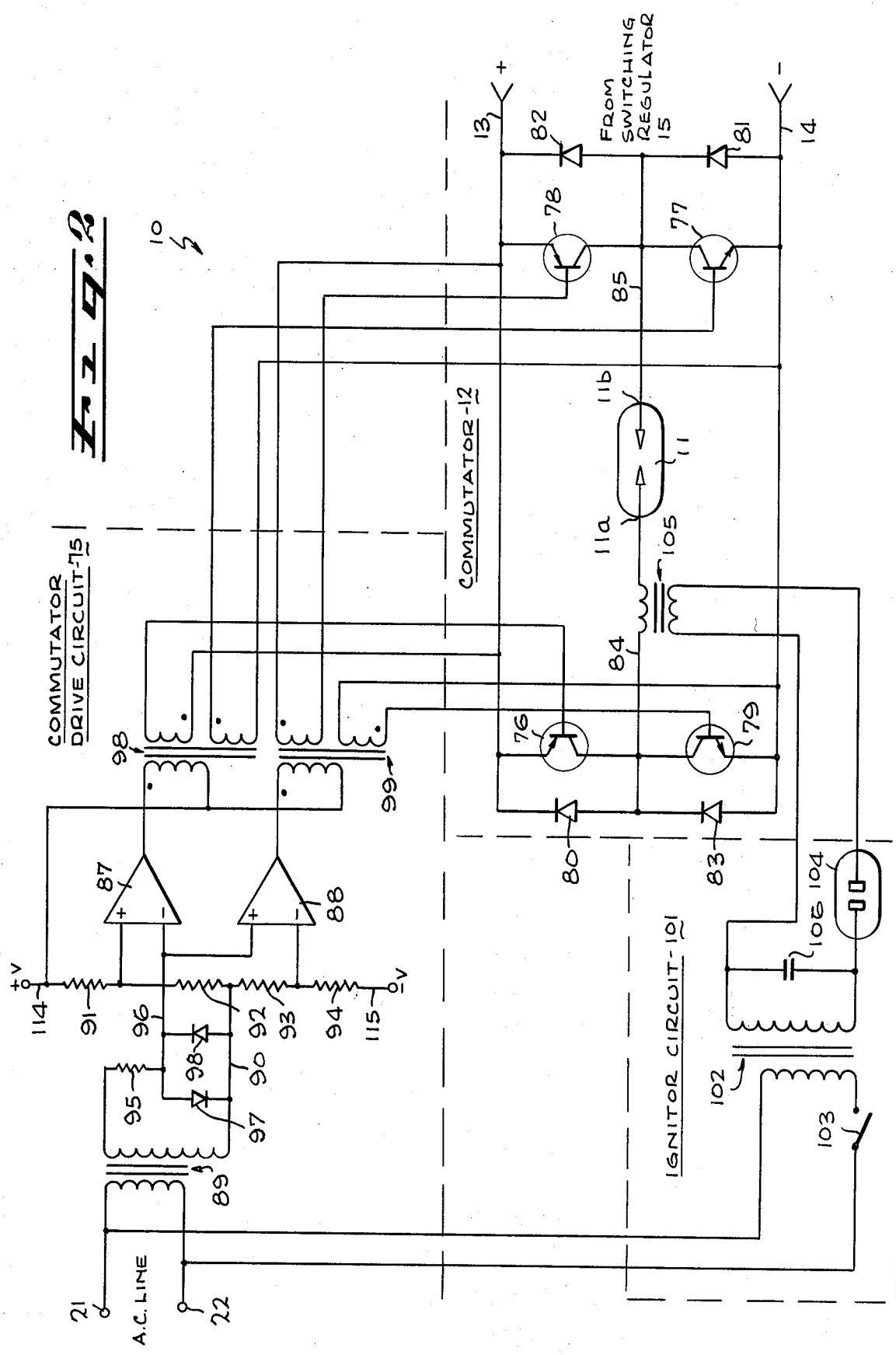

3,999,100

LAMP POWER SUPPLY USING A SWITCHING REGULATOR AND COMMUTATOR

BACKGROUND OF THE INVENTION

1. Field of the Invention

The present invention relates to a power supply for an ac metal halide lamp, and specifically to such a supply wherein a commutator is used to supply regulated dc power to the lamp with alternating polarity.

2. Description of the Prior Art

Metal halide lamps have gained considerable popularity as light sources for television, photographic and theater applications. Such metalogen lamps have a radiation temperature similar to daylight, good color rendering characteristics, high luminous efficiency and small arc dimensions.

These favorable characteristics are achieved by using exact amounts of the rare earths dysprosium, holmium and thulium supplemented by bromine, iodine and mercury. Because of this make-up, metal halide lamps have rigorous power supply requirements. First, a high voltage pulse is required for ignition. After ignition, but while still cold, the lamps can operate as half wave rectifiers. In that operational state, which normally lasts less than 1 second, the supplied power must not exceed a certain peak current value typically on the order of 70 amperes.

During lamp warm up, which may last several minutes, the lamp voltage is considerably lower than after the operating temperature has been reached. For example, a lamp rated at 95 volts after warm up may operate at about 20 volts during the warm up period. Furthermore, the maximum lamp current during warm up may be considerably higher (typically 13 amperes) than during later operation. (typically 6.95 amperes). Both during warm up and after, a certain maximum lamp power (typically on the order of 660 watts) cannot be exceeded without damaging the lamp.

The metal halide lamps require ac operation. Thus both the warm up and normal operating voltages and currents must be provided by an ac power supply. Moreover, it is desirable to provide constant power to the lamp, so as to insure the constant light output and color temperature required for photographic and television applications.

In the past, these power supply requirements have necessitated the use of special inductive ballasts in which the voltage to current ratio is constant within small tolerances, and is barely influenced by temperature changes and a magnetic environment. Such power supplies are very heavy, owing to the considerable weight of the inductive ballast itself. A weight of 150 pounds is not uncommon. This is a serious disadvantage. Although the lamp itself is very light, its portability is seriously impaired by the heavy weight of the power supply.

In the prior art ballast-type supplies, a series choke or inductor is used wherein the voltage is dropped in accordance with the amount of current drawn, so as to regulate the power output. This requires a differential between the rated lamp voltage and the line voltage. For a metal halide lamp that is rated at 95 volts, a 220 volt source typically must be used. Thus to operate from a 110 volt ac line, a step up transformer must be used in addition to the ballast inductor. Further, since the inductor is adapted for operation at a particular input voltage, taps must be provided to compensate for different line voltages. All of these factors add to the cost, weight and complexity of the power supply, and may lead to reduced efficiency.

An object of the present invention is to provide a power supply for a metal halide lamp which does not require a ballast inductor. Another object is to provide a power supply in which a regulated ac output is obtained by the cooperation of a dc regulator and a commutator which provides the regulated dc signal to the load with alternating polarity. Such a power supply is considerably lighter than those of the prior art, as well as being lower in cost and highly efficient.

SUMMARY OF THE INVENTION

These and other objectives are achieved in a power supply that employs a dc regulator in conjunction with a commutator which provides the regulated dc power to a load with alternating polarity. The supply advantageously is used with a metal halide lamp.

In a preferred embodiment, the inventive power supply utilizes a switching regulator operating at a high frequency, typically on the order of 20 kHz. The duty cycle of the switching regulator, and hence the output power level, is controlled by a feedback circuit that is responsive to both the dc current and voltage supplied to the commutator.

The commutator itself has two pairs of transistors that are alternately switched into conduction so as to connect the regulated dc voltage to the load with alternating polarity. The alternation rate typically is at the ac line frequency, but may be at other rates. For example, it may be synchronized to the shutter rate of a motion picture camera. In any event, the switching or alternation time is very fast, typically on the order of 10 microseconds. This results in flickerless light output, since the metal halide lamp has insufficient time to cool down and heat up again during the switching interval.

Use of combined current and voltage sensing results in a substantially constant power output to the lamp. As a result, constant light output and color temperature is achieved.

The feedback circuit is configured so as to provide substantially higher current to the lamp during its warm up. When the normal operating level is reached, the voltage feedback is modified so that the necessary power and maximum current ratings of the lamp are satisfied.

BRIEF DESCRIPTION OF THE DRAWINGS

A detailed description of the invention will be made with reference to the accompanying drawings wherein:

FIGS. 1 and 2 together comprise an electrical schematic diagram of a power supply for a metal halide lamp employing a commutator and a switching regulator.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are unapplicable or unless specific exception is made.

The inventive power supply 10 advantageously is used to power a metal halide lamp 11. A commutator 12 (FIG. 2) is used to switch or alternate the current to the lamp 11 at the ac line frequency. The commutator 12 thus permits use of dc regulation while still supplying the requisite alternating current to the metal halide lamp.

Regulated dc power is supplied to the commutator 12 via the lines 13 and 14 from a switching regulator 15 (FIG. 1). Unregulated dc voltage is supplied to the regulator 15 via lines 18 and 19 from a bridge rectifier 20 connected to the ac line via terminals 21, 22 and a current limiting resistor 23. The dc output of the rectifier 20 is filtered by a capacitor 24.

The dc voltage supplied to the commutator 12 is regulated so as to provide constant power to the lamp 11. To this end, a current and voltage sensing circuit 26 operates in conjunction with an oscillator 27, a comparator 28 and a regulator drive circuit 29 to control the duty cycle or on-time of the switching regulator 15. If the sensed power to the lamp 11 should increase above the nominal value, the resultant feedback will cause a reduction in the duty cycle of the regulator 15 so as to decrease the output power to the desired level. Conversely, a drop in the output power will cause an increase in the regulator 15 duty cycle.

The regulator 15 uses a series-connected transistor 30 having a fast switching time. The transistor 30 alternately is turned on and off by the drive circuit 29 at a frequency (typically 20kHz) established by the oscillator 27. The duty cycle or ratio of the on-to-off times is established by the feedback circuitry, as described below.

When the transistor 30 is on, current flows from the line 18 via the transistor 30 and an inductor 31 to the line 14. Energy is stored in the inductor 31, and a capacitor 32 is charged. When the transistor 30 goes off, energy stored in the inductor 31 results in a current flow via a diode 33 to the output lines 13, 14. This, combined with the discharge of the capacitor 32, maintains a dc output across the line 13, 14 even though the transistor 30 is off. The result is a dc voltage across the lines 13, 14 the level of which is directly related to the duty cycle of the transistor 30.

This duty cycle is controlled in response to the power drawn by the lamp 11 as determined by the current and voltage sensing circuit 26. This circuit includes a current sensing resistor 35 connected in series between the line 19 and the line 13. The voltage drop across the resistor 35 is indicative of the amount of current being drawn by the lamp 11. This voltage drop is sensed by an operational amplifier ("op amp") 37.

To this end, the amplifier 37 is connected to compare the voltage at the output terminal 38 of the resistor 35 with a fixed voltage referenced to the input terminal 39 of the resistor 35. Accordingly, the terminal 38 is connected via a resistor 40 to one input terminal 41 of the op amp 37. This terminal 41 thus receives a voltage indicative of the output current.

The other terminal 42 of the op amp 37 receives a reference voltage derived from a zener diode 43 connected in series with a resistor 44 between the terminal 39 and a dc return line 45. A potentiometer 46 connected across the zener diode 43 permits adjustment of the reference voltage level. The tap on this potentiometer 46 is connected via a resistor 47 to the op amp terminal 42. That terminal also is connected to the op amp 37 output via a resistor 48, and to the other terminal 41 via a capacitor 49. With this arrangement, the signal produced at the output terminal 50 of the op amp 37 is indicative of the difference between the sense signal at the terminal 41 and the fixed reference signal at the terminal 42.

To provide a feedback signal that is indicative of power drawn by the lamp 11, the voltage to that lamp also is sensed by the circuit 26. Specifically, the voltage on the line 14 also is supplied to the op amp input terminal 41 via a pair of resistors 52, 53. The terminal 41 acts as a summing point for the two voltages indicative of output current and voltage. Thus the net input at the terminal 41 is indicative of power drawn by the lamp 11.

The output signal from the op amp 37 is amplified by another operational amplifier 54 and supplied via a resistor 55 to one input terminal 56 of the comparator 28. This terminal 56 is connected to one input of an operational amplifier 57. The signal at the terminal 56 is a dc level the magnitude of which is indicative of the output power to the lamp 11. The other input to the comparator 28 is a triangular wave output signal from the oscillator 27. This is supplied via a line 58 to the other input of the op amp 57.

The dc level at the input 56 lies between the minimum and maximum voltages of the triangular wave from the oscillator 27. When the triangular wave voltage exceeds the level on the line 56, the op amp 57 provides a high output on the line 59. When the triangular wave voltage is below the level of the signal on the line 56, a low output is obtained on the line 59. As a consequence, the signal on the line 59 is a square wave having a duty cycle established by the level of the feedback signal at the terminal 56. If this feedback signal level decreases, a greater portion of the triangular wave from the oscillator 27 will be above the threshhold level, and the signal at the op amp output 59 will have a longer duty cycle or on-time. Conversely, when more power is drawn by the lamp 11 so that the feedback signal at the terminal 56 is of higher voltage, a smaller portion of the triangular wave on the line 58 will be above this level, so that the op amp 57 output will be of shorter duty cycle. The frequency of the output signal at the terminal 59 is established by the oscillator 27.

The signal at the op amp 57 output terminal 59 is used to control the switching regulator drive circuit 29, and hence to control the duty cycle of the switching regulator 15.

This is accomplished by using the op amp 57 output to drive a transformer 61. The secondary of the transformer is connected so as to turn a transistor 62 on and off in unison with the output from the op amp 57. One secondary terminal of the transformer 61 is connected directly to the emitter of the transistor 62 and the other terminal via a diode 63 to the base of the transistor 62. A resistor 64 shunts the diode 63, and another diode 65 is connected between the base and emitter of the transistor 62.

With this arrangement, when a high output is obtained at the op amp terminal 59, the transistor 62 is switched off. As a result, a pair of transistors 66, 67 connected as a Darlington circuit are turned on. When the transistor 66 goes on, voltage from a line 68 is supplied via a resistor 69 to the emitter of the switching transistor 30. When the transistor 67 goes on, a somewhat lower voltage from a line 70 is supplied via a resistor 71 to the base of the transistor 30 and via a resistor 72 to the emitter of the transistor 30. This causes rapid turn on of the transistor 30. When the op amp 57 output signal goes low, the transient induced in the transformer 61 secondary rapidly turns on the transistor 62. This turns off the Darlington-connected transistor 66, 67 and cuts off the switching transistor 30.

In this manner, the duty cycle of the switching regulator 15 is controlled in response to the output current and voltage sensing signals supplied respectively via the resistors 40 and 53 to the summing point 41 in the circuit 26. The duty cycle of the regulator 15 thereby is adjusted so as to maintain constant power to the lamp 11.

The regulated dc voltage supplied on the lines 13, 14 is provided to the lamp 11 in alternating polarity by the commutator 12. An important requirement of the commutator 12 is that it performs the switching or alternation function in such a manner that no visible flicker will be produced from the lamp 11. In the present invention this is accomplished by causing the switching or current reversal to occur very rapidly, typically in about 10 microseconds. This is accomplished by a commutator drive circuit 75 that controls the rapid turn on and turn off of four commutation transistors 76–79. These transistors are shunted by respective diodes 80–83.

Commutation is accomplished in the following manner. Pairs of transistors 76–77 and 78–79 are turned on alternately at the ac line frequency. Thus during one half cycle of the ac present at the terminals 21, 22, the transistors 76 and 77 will be on, and the transistors 78 and 79 will be off. With this configuration, regulated positive voltage from the line 13 will be supplied via the transistor 76 and a line 84 to one terminal 11a of the lamp 11. Negative voltage from the line 14 will be supplied via the transistor 77 and the line 85 to the other terminal 11b of the lamp 11. During the other half of the ac cycle the transistors 78 and 79 will be on. Thus positive voltage from the line 13 will be supplied via the transistor 78 to the terminal 11b, and negative voltage from the line 14 will be supplied via the transistor 79 to the terminal 11a. In this manner, the metal halide lamp 11 receives a voltage of alternating polarity.

To accomplish very rapid switching, the base bias on the transistors 76–79 is rapidly driven to saturation. This is accomplished by the commutator drive circuit 75 which employs a pair of operational amplifiers 87, 88 that are alternately switched on and off. This switching is accomplished by a transformer 89 connected across the ac line terminals 21, 22. One terminal of the transformer 89 secondary is connected via a line 90 to the center of a voltage divider consisting of four resistors 91–94 connected in series across a voltage source. The other terminal of the transformer 89 secondary is connected via a resistor 95 and a line 96 to different polarity terminals of the op amps 87 and 88. A pair of back-to-back clipping diodes 97, 98 are connected between the lines 90 and 96. A positive voltage from the junction of the resistors 91 and 92 is supplied to the other input terminal of the op amp 87, and a negative voltage from the junction of the resistors 93 and 94 is connected to the other terminal of the op amp 88.

During one-half of the ac cycle, current from the secondary of the transformer 89 flows through the resistor 95 and the diode 97. In this instance, the voltage on the line 96 is positive with respect to that on the line 90. This tends to drive the op amp 88 into conduction. The voltage across the transformer 89 secondary rises toward a very high value (typically 100 volts or more) compared with the voltage provided at the junction of the resistors 93 and 94, typically about −1 volt.

The op amp 88 operates in response to the difference in voltage at its input terminals, thus the op amp 88 will turn on at the very beginning of the positive swing of the ac line, as soon as the transformer 89 output voltage on the line 96 exceeds this 1 volt level. Since the voltage rises toward a high value during this one-half cycle, the 1 volt level is reached exceedingly close to the beginning of the half cycle (i.e., immediately after the zero crossing of the ac line voltage). As a consequence, the op amp 88 will be switched on very fast, typically in about 10 microseconds. Similarly, when the ac line voltage goes through the next zero crossing and the line 96 begins to go negative, the op amp 87 will turn on very rapidly, and the op amp 88 will go off very rapidly. The clipping diodes 97, 98 prevent the actual voltage between the lines 90, 96 from reaching a level very much higher than that required to cause switching of the op amps 87 and 88. Note that the op amp 88 will be turned on and off when the voltage at the line 96 goes above and drops below a reference voltage level of one polarity. Both such transitions occur during the same half cycle of the ac source. Conversely, the op amp 87 will be turned on and off when the voltage on the line 90 goes above and drops below a like reference level of opposite polarity. Both of these transitions occur during the other half cycle of the ac source. As a result, the op amp 87 or 88 which is conducting always will be turned off before the other op amp is turned on.

This arrangement is important, because it insures turn-off of one transistor pair 76, 77 or 78, 79 before turn-on of the other pair. If this were not the case, there would be a brief period during which all the transistors 76–79 were on. This would result in a direct short across the dc input terminals 13, 14 from the switching regulator 15, and would make the system inoperative. However, with the arrangement just described, the on time of each transistor pair 76, 77 or 78, 79 is slightly shorter than the off time. This insures that each transistor pair 76, 77 and 78, 79 will be completely off when the other pair goes on.

The delay time between turn-off of one transistor pair 76, 77 or 78, 79 and turn-on of the other pair should be shorter than the storage or switching time of the transistors. This is achieved by appropriate selection of the reference voltages at which the op amps 87 and 88 are switched. These voltages in turn are established by selecting the appropriate values of the resistors 91–94, since the voltages at the junctions of the resistors 91, 92 and 93, 94 set the levels at which the respective op amps 87 and 88 are turned on. The op amps 87, 88 control the commutator transistors 76–79 via a pair of pulse transformers 98, 99. The transformer 98 has two secondary windings respectively connected to provide the base drive to the transistors 76 and 77. The transformer 99 likewise has a pair of secondary windings connected to control the transistors 78 and 79.

When the op amp 87 goes on, the signals induced in the secondaries of the transformer 98 rapidly switch on the transistors 76 and 77. Just prior to this, the op amp 88 has turned off, and the transients induced in the output windings to the transformer 99 aid the rapid turn off of the transistors 78 and 79. The switching is so rapid that no flicker is seen in the light output from the lamp 11. The absence of flicker results because the lamp 11 cannot noticeably cool down or heat up during the very rapid (about 10 microseconds) switching time.

The lamp 11 initially may be turned on by an ignitor circuit 101 (FIG. 2). This circuit includes a step-up transformer 102 connected via a switch 103 to the ac line terminals 21, 22. The high voltage secondary of the transformer 102 is connected via a spark gap 104 to the primary of a transformer 105 in series with the line 84. A capacitor 106 shunts the transformer 102 secondary.

When the switch 103 is closed, the high voltage at the transformer 102 secondary charges up the capacitor 106. When the charge exceeds the breakdown voltage of the spark gap 104, the capacitor discharges through the spark gap 104, thereby inducing sufficient voltage via the transformer 105 to ignite the lamp 11.

When a metal halide lamp first is ignited, it operates at low voltage but relatively high current. For example, a lamp that has a rated voltage of 95 volts may have a warm up value of 20 volts. Moreover, a higher current may be drawn by the lamp during warm up than later, when the lamp is operating at its rated voltage. The regulation provided by the inventive power supply is configured to provide the extra current required when the lamp 11 is operating at low voltage during warm up. To this end, the voltage sensing circuit 26 includes a resistor 108 and a zener diode 109 connected in series between the line 19 and the junction of the resistors 52 and 53. During warm up, when the lamp 11 is operating at low voltage, the zener diode 109 is non-conducting. Therefore, the voltage-indicating signal supplied to the summing point 41 is derived from the output voltage line 14 directly through the resistors 52 and 53 as described above. These values are selected so as to permit the output current to rise to the level required during warm up (typically 7 to 13 amperes).

As the lamp 11 warms up, its voltage increases (typically from about 20 volts during warm up to about 95 volts after warm up). As a result, the voltage drop between the lines 13 and 14 increases sufficiently so as to cause breakdown or conduction of the zener 109. This puts the resistor 108 in series with the resistor 52 across the lines 13 and 14. This has the effect of reducing the level of the voltage-indicating signal provided to the summing point 41 via the resistor 53. As a result, the change in regulator duty cycle, and hence change in output will be reduced for the same voltage change.

Voltage to power the oscillator 27, comparator 28 and commutator drive circuit 75 is supplied by a bridge rectifier 111 (FIG. 1) connected to a low voltage secondary winding of a power transformer 112. The output of the bridge rectifier 111 is filtered by a capacitor 113 and supplied via lines 114 and 115 to the appropriate circuits.

Power to the drive circuit 29 is obtained from another secondary winding 112a of the transformer 112. A portion of this secondary winding 112 is connected to a pair of diodes 117, 118 that operate as a full wave rectifier. These provide a voltage on the line 70 that is filtered by a capacitor 119. A higher voltage is provided on the line 68 by a diode 120 and a filter capacitor 121 connected between one end of the transformer secondary 112 and the center tap 122 of the transformer section used to provide the voltage on the line 70.

In the sensing circuit 26, a fixed reference voltage is provided to one input of the op amp 54 by a voltage divider network consisting of a pair of resistors 125 and 126. The output terminal 50 of the op amp 37 is connected to the +v line 114 via a resistor 127 and to the other input of the op amp 54 via a resistor 128. This input also is connected to the op amp 54 output via a resistor 129. A divider consisting of two resistors 130 and 131 provides the fixed reference voltage at the input terminal 56 of the op amp 57 in the comparator 28. A resistor 139 isolates the dc voltage supply to the comparator 28.

The oscillator 27 is conventional, and includes resistors 132–136 and a capacitor 137 interconnected as shown in FIG. 1 with an op amp 138. The oscillator output on the line 58 is a triangular wave. The op amps 37, 54, 57 and 138 together may be implemented using a Motorola type MC3302 quad comparator integrated circuit.

Although the illustrated commutator 12 (FIG. 2) utilizes transistors, the invention is not so limited. Thus either or both pairs of transistors 76, 77 and 78, 79 may be replaced by silicon controlled rectifiers. Furthermore, although the commutator 12 shown herein is operated at the ac line frequency, this is not a requirement of the invention. For example, for motion picture applications, it may be desirable to operate the commutator in synchronism with the shutter rate of the motion picture camera. For television use, where the television frame rate is synced to the ac line, commutation at this ac line frequency is preferred.

Although a switching regulator 15 is employed in the illustrated power supply, the invention is not so limited. Any other type of dc regulator could be used in conjunction with the commutator 12.

We claim:
1. A power supply adapted for use with a metal halide or like ac lamp, comprising:
   a source of unregulated dc power,
   a dc regulator connected to regulate the dc power from said source,
   a commutator connected to receive the regulated dc power from said regulator and to supply said power with alternating polarity to said lamp, and
   feedback circuit means for sensing the dc current and voltage drawn by said lamp via said commutator, and for controlling said dc regulator in response to said sensed current and voltage so that substantially constant power is supplied to said lamp.
2. A power supply according to claim 1 wherein said dc regulator is a switching regulator.
3. A power supply according to claim 1 together with;
   commutator drive circuit means connected to said commutator for switching said commutator sufficiently rapidly so that said lamp will not flicker.
4. A power supply according to claim 3 wherein said commutator comprises a first pair of semiconductor switching devices for providing said regulated dc power to said lamp with a first polarity when said first pair of devices are conducting, and a second pair of semiconductor switching devices for providing said regulated dc power to said lamp with the opposite polarity when said second pair of devices are conducting, and wherein said commutator drive means turns on said first and second pair of devices alternately, said drive means including circuitry for insuring complete turn off of one pair of devices before the other pair is turned on.
5. A power supply according to claim 4 wherein said circuitry comprises;
   first means for turning on one pair of said devices when an ac control signal exceeds a certain refer- ence level of positive polarity and for turning off said one pair of devices when said ac control signal drops below a reference level of the same positive polarity, so that said one pair of devices is both turned on and turned off during the same one half of the ac control signal cycle, and second like means for turning on and off the other pair of devices when the same ac control signal exceeds and drops below respective reference levels each of negative polarity, so that said other pair of devices is both turned on and turned off during the same opposite half of the ac control signal cycle, whereby each pair of devices is turn off completely before the other pair of devices is turned on.

6. A power supply according to claim 5 wherein said first and second pairs of devices comprise transistors, and wherein said circuitry comprises;

first and second pulse transformers each having a pair of secondary windings connected to provide base drive to the respective first and second pairs of transistors, first and second switching means for providing a drive signal to the primary of said first and second pulse transformers respectively during alternate half cycles of an ac control signal, said first switching means being switched on to provide said drive signal to said first pulse transformer when said ac control signal exceeds a first reference level of one polarity, said second switching means being switched on to provide said drive signal to said second pulse transformer when said ac control signal exceeds a second reference level of opposite polarity, said ac control signal tending toward a maximum voltage considerably in excess of said first and second reference levels so that said switching means are switched on very rapidly after respective alternate zero crossings of said ac control signal.

7. A power supply for a metal halide or like ac lamp load, comprising:

a dc regulator connected to regulate a source of dc power, said regulator being a switching regulator having a substantially constant frequency but variable duty cycle, a commutator connected to receive the regulated dc output of said regulator and to supply said power with alternating polarity to said load, and feedback means for sensing the dc voltage and current drawn from said regulator by said commutator and load, and for controlling the switching regulator duty cycle in response to said sensed dc voltage and current so as to supply substantially constant power to said load.

8. A power supply according to claim 7 wherein said feedback means comprises;

series resistor means for obtaining a first feedback control voltage proportional to the current supplied by said regulator to said load via said commutator, voltage sensing means for obtaining a second feedback control voltage proportional to the voltage supplied by said regulator to said load via said commutator, and operational amplifier means for combining said first and second feedback control voltages to derive a combined feedback control voltage indicative of the power drawn by said load, and regulator drive means for controlling the duty cycle of said switching regulator in response to said combined feedback control voltage so as to provide substantially constant power to said load.

9. A power supply according to claim 8 wherein said voltage sensing means further includes a voltage divider and a zener diode connected so as to change the proportionality between said second feedback control voltage and the voltage supplied by said regulator when said supplied voltage is sufficiently great so as to cause conduction of said zener diode.

10. A power supply according to claim 9 wherein breakdown of said zener diode occurs at a voltage above the warm-up voltage of said lamp, but below the normal operating voltage of said lamp, so that the feedback characteristics are different during warm-up and during normal lamp operation.

11. A power supply according to claim 7 wherein said commutator comprises;

first and second sets of semiconductor switching devices that are alternately driven into conduction, and are connected to provide said regulated dc output to said load with alternate polarity.

12. A power supply according to claim 11 together with igniter means for igniting said lamp.

13. A power supply according to claim 11 wherein said first set of devices comprises a first pair of transistors connected to provide said regulated dc output to said load with one polarity when said first pair of transistors is conducting, and wherein said second set comprises a second pair of transistors connected to provide said dc output to said load with the opposite polarity when conducting, and commutator drive means for alternately turning on said first and second pairs of transistors.

14. A power supply according to claim 13 wherein said commutator drive means comprises:

first means for turning on said first pair of transistors when an ac control signal exceeds a reference level of first polarity and for turning off said first pair when said ac control signal drops below a reference level of said same first polarity, so that said first pair of transistors are turned both on and off during each first cycle of said ac control signal, and second means for turning on and off said second pair of transistors when said ac control signal exceeds or drops below respective reference levels of polarity opposite said first polarity, so that said second pairs of transistors are turned both on and off during each second half cycle of the ac control signal.

15. A power supply according to claim 14 wherein said first means comprises a first operational amplifier that is switched on when said control voltage exceeds a reference level of positive polarity, and wherein said second means comprises a second operational amplifier that it switched on when said control voltage exceeds a reference level of negative polarity, and wherein said reference levels are low with respect to the maximum levels toward which said ac control signal rises during alternate ac half cycles, so that said operational amplifiers and hence said transistors are switched very rapidly.

16. A power supply according to claim 15 wherein said reference level of first polarity is a first reference voltage that is applied to one comparator terminal of said first operational amplifier and said reference level of opposite polarity is a second reference voltage that is applied to one comparator terminal of said second operational amplifier, and wherein said ac control signal is supplied to the other comparator terminal of both operational amplifiers.

17. A power supply according to claim 15 wherein said ac control signal is at the ac line frequency.

18. A power supply according to claim 15 wherein said ac control signal is at the shutter rate of a motion picture camera.

19. A power supply for a metal halide or like ac lamp load, comprising:
 a dc regulator connected to regulate a source of dc power,
 a commutator connected to receive the regulated dc output of said regulator and to supply said power with alternating polarity to said load, said commutator comprising first and second sets of semiconductor switching devices that are alternately driven into conduction,
 said first set of devices comprising a first pair of transistors connected to provide said regulated dc output to said load with one polarity when said first pair of transistors is conducting, said second set comprising a second pair of transistors connected to provide said dc output to said load with the opposite polarity when conducting,
 commutator drive means for alternately turning on said first and second pairs of transistors, comprising:
 first means for turning on said first pair of transistors when an ac control signal exceeds a reference level of first polarity and for turning off said first pair when said ac control signal drops below a reference level of said same first polarity, so that said first pair of transistors are turned both on and off during each first half cycle of said ac control signal, and
 second means for turning on and off said second pair of transistors when said ac control signal exceeds or drops below respective reference levels of polarity opposite said first polarity, so that said second pairs of transistors are turned both on and off during each second half cycle of the ac control signal,
 said first means comprising a first operational amplifier that is switched on when said control voltage exceeds a reference level of positive polarity, and said second means comprising a second operational amplifier that is switched on when said control voltage exceeds a reference level of negative polarity, and wherein said reference levels are low with respect to the maximum levels toward which said ac control signal rises during alternate ac half cycles, so that said operational amplifiers and hence said transistors are switched very rapidly, and
 wherein said reference level of first polarity is a first reference voltage that is applied to one comparator terminal of said first operational amplifier and said reference level of opposite polarity is a second reference voltage that is applied to one comparator terminal of said second operational amplifier, wherein said ac control signal is supplied to the other comparator terminal of both operational amplifiers and
 wherein said ac control signal is obtained from the ac line and is clipped.

20. A power supply according to claim 19 wherein said ac control signal rises toward about 100 volts, alternately positive and negative, and wherein said reference levels are on the order of about 1 volt positive and negative.

* * * * *